United States Patent [19]

Okita et al.

[11] 3,757,154

[45] Sept. 4, 1973

[54] APPARATUS FOR AUTOMATICALLY ELIMINATING THE INFLUENCE OF THE EARTH'S MAGNETIC FIELD ON COLOR TELEVISION RECEIVERS

[75] Inventors: Tetsuo Okita; Junji Inagawa, both of Tokyo, Japan

[73] Assignee: Sony Corporation, Tokyo, Japan

[22] Filed: Mar. 3, 1971

[21] Appl. No.: 120,689

Related U.S. Application Data

[63] Continuation-in-part of Ser. No. 787,385, Dec. 27, 1968, abandoned.

[52] U.S. Cl. .............. 315/8, 317/157.5 TV, 324/46
[51] Int. Cl. .......................... H01f 13/00, H01j 29/98
[58] Field of Search .......................................... 215/8

[56] References Cited

UNITED STATES PATENTS

| | | | |
|---|---|---|---|
| 2,767,253 | 10/1956 | Camras | 179/100.2 |
| 2,925,524 | 2/1960 | Heil | 315/8 |
| 3,158,754 | 11/1964 | Yu | 307/251 |
| 3,187,650 | 6/1965 | Hudson | 315/8 |
| 3,519,899 | 7/1970 | Yamada | 324/46 X |
| 3,535,626 | 10/1970 | Uemura et al. | 338/32 R |
| 3,546,579 | 12/1970 | Paul et al. | 324/46 |
| 3,553,498 | 1/1971 | Yamada | 324/46 X |

*Primary Examiner*—Robert Segal
*Attorney*—Hill, Sherman, Meroni, Gross & Simpson

[57] ABSTRACT

An apparatus for eliminating the influence of the earth's magnetic field on color television receivers including a coil disposed adjacent the face of the cathode ray tube and solid state means sensitive to the earth's magnetic field for generating a signal through the coils to compensate for different field effects as the positioning of the television set is varied.

4 Claims, 16 Drawing Figures

INVENTOR.
TETSUO TOKITA
JUNJI INAGAWA
BY Hill, Sherman, Meroni, Gross & Simpson
ATTORNEYS INVENTOR.
TETSUO TOKITA
JUNJI INAGAWA
BY Hill, Sherman, Meroni, Gross & Simpson
ATTORNEYS INVENTOR.
TETSUO TOKITA
JUNJI INAGAWA
BY Hill, Sherman, Meroni, Gross & Simpson
ATTORNEYS

INVENTOR.
TETSUO TOKITA
JUNJI INAGAWA

BY Hill, Sherman, Meroni, Gross & Simpson
ATTORNEYS

Fig. 10A Fig. 10B Fig. 10C
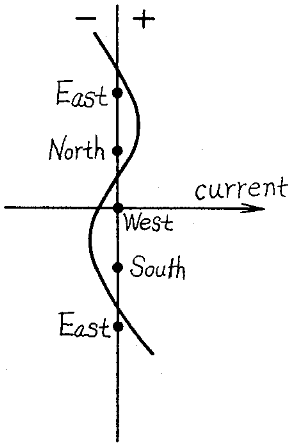
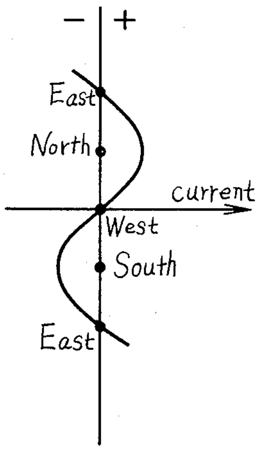
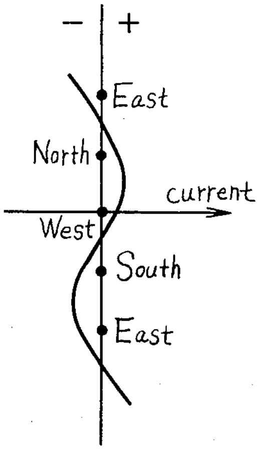
Fig. 11
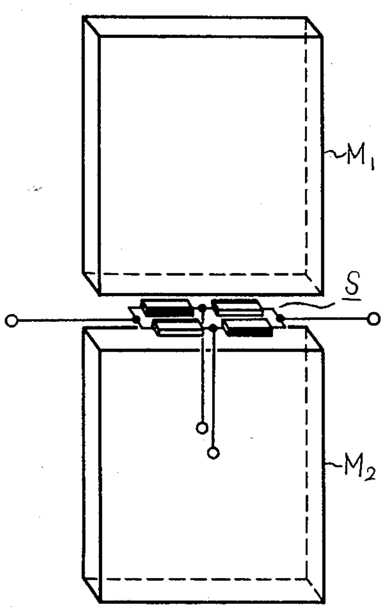
INVENTOR.
TETSUO TOKITA
JUNJI INAGAWA
BY Hill, Sherman, Meroni, Gross & Simpson
ATTORNEYS

APPARATUS FOR AUTOMATICALLY ELIMINATING THE INFLUENCE OF THE EARTH'S MAGNETIC FIELD ON COLOR TELEVISION RECEIVERS

CROSS-REFERENCES TO RELATED APPLICATIONS

This application is a Continuation-in-Part of our prior patent application Ser. No. 787,385 filed Dec. 27, 1968 and now abandoned entitled APPARATUS FOR AUTOMATICALLY ELIMINATING THE INFLUENCE OF THE EARTH'S MAGNETIC FIELD ON COLOR TELEVISION RECEIVERS.

This invention utilizes magneto-resistance elements and circuits such as described and shown in Pat. No. 3,519,899, filed Oct. 9, 1967, issued July 7, 1970, entitled MAGNETORESISTANCE ELEMENT and assigned to the assignee of the present application, which material is hereby incorporated by reference. Further description of magnetoresistance elements that may be used with this invention are found in Pat. No. 3,553,498 entitled MAGNETORESISTANCE ELEMENT which issued Jan. 5, 1971; Pat. No. 3,535,626 entitled MAGNETORESISTANCE ELEMENTS FOR PROTECTING MAGNETIC FIELDS which issued Oct. 20, 1970; application Ser. No. 852,862 filed Aug. 25, 1969 entitled MAGNETOSENSITIVE ELEMENT; application Ser. No. 56,444 filed July 20, 1970 entitled A MAGNETORESISTANCE ELEMENT AND METHOD OF MAKING THE SAME; and, application Ser. No. 748,764 filed July 30, 1968 entitled MAGNETORESISTANCE ELEMENT AND METHOD OF MAKING THE ELEMENT. All of the above patents and applications for patents are assigned to the assignee of the present invention, and, all of which materials are hereby incorporated by reference in this application.

BACKGROUND OF THE INVENTION

1. Field of the Invention

This invention relates to a color television receiver, and more particularly to an apparatus for automatically eliminating the influence of earth's magnetic field on the color television receiver.

2. Description of the Prior Art

In the color television receiver an electron beam is likely to be deflected in the Braun tube under the influence of earth's magnetic field and is thereby prevented from striking the fluorescent screen at a predetermined location which results in deterioration of color purity. The tendency is marked especially in cathode ray tubes of the type in which the electron beam is retarded as it passes through a magnetic field as in the case of the chromatron tube.

In order to prevent the adverse influence of the earth's magnetic field on the color television receiver, it has been the practice in prior art to provide a coil around the front panel of the Braun tube. Coils may be coupled with the aforementioned coil and positioned in the four corners of the front panel, these coils being supplied with DC currents of moderate values. When the color purity is lowered with a change of the earth's magnetic field by shifting the position of the color television receiver, the values of the DC currents applied to the values of the DC currents applied to the coils are caused to vary to produce magnetic fields which would offset the influence of the earth's magnetic field, thus avoiding the lowering of the color purity.

However, this prior method necessitates three of five variable resistors and, in addition, adjustment of the current value requires much skill and hence is difficult for those unskilled in handling color television receivers.

SUMMARY OF THE INVENTION

In view of the foregoing, ot is a primary object of this invention to provide an apparatus for automatically eliminating the adverse influence of the earth's magnetic field on an electron beam in accordance with the positioning of a color television receiver.

It is another object of the invention to provide an apparatus for preventing the influence of the earth's magnetic field on an electron beam for use in color television receivers in which the earth's magnetic field is detected by the use of magnetoresistance elements and means are provided for compensating for such field.

It is a further object of this invention to provide an apparatus for eliminating the influence of the earth's magnetic field on color television receivers which provides that currents are applied to coils disposed around the cathode ray tube in response to voltage variations produced by magnetoresistance elements corresponding to the earth's magnetic field.

It is still a further object of this invention for automatically preventing deterioration of the color purity due to the earth's magnetic field in accordance with the positioning of color television receivers.

Other objects, features and advantages of this invention will become apparent from the following description taken in conjunction with the accompanying drawings.

BRIEF DESCRIPTION OF THE DRAWINGS

FIGS. 10A, 10B and 10C are characteristic curves for explaining the present invention; and, FIG. 11 is a schematic diagram illustrating one example of means for improving the sensitivity of the magnetoresistance element.

DESCRIPTION OF THE PREFERRED EMBODIMENTS

A description will be given first of a magnetoresistance element which may be employed in this invention.

The magnetoresistance element is a semiconductor element which has PN, PI and NI junctions and a region of high carrier recombination velocity; this element is basically different from conventional elements of this kind and exhibits a high degree of sensitivity.

Figure 1:
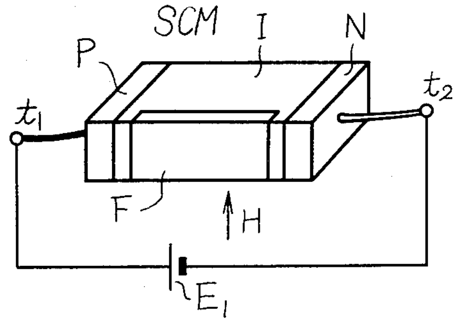
FIG. 1 is a perspective view schematically illustrating one example of a magnetoresistance element which may be used in the present invention.

In FIG. 1 there is exemplified the magnetoresistance element generally indicated by SCM, which consists of a high resistance region I formed of, for example, an intrinsic germanium semiconductor into which carriers can be sufficiently injected. On both end faces of the high resistance region I, there are formed P- and N-type regions, P and N, of relatively high impurity concentrations which are capable of sufficient injection of the carriers into the high resistance region I, and a recombination region F of high recombination velocity is formed on one side of the high resistance region I between the P- and N-type regions P and N. The patent to Hwa N. Yu, No. 3,158,754, which issued on Nov. 24, 1964, discloses P-I-N doping impurities and their concentrations for the production P-I-N semi-conductor structures. Also see Yamada Pat. No. 3,519,899.

Reference characters $t_1$ and $t_2$ indicate terminals respectively connected to the high impurity regions P and N. A bias power source $E_1$ is connected to the magnetoresistance element SCM in such a manner that the positive electrode of the power source $E_1$ is connected to the P-type region P while the negative electrode is connected to the N-type region N.

Figure 2:
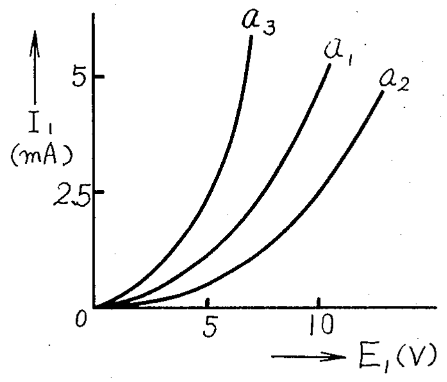
FIG. 2 is a graph showing the current versus voltage characteristic of the magnetoresistance element exemplified in FIG. 1.

In such a case the magnetoresistance element SCM exhibits a voltage-current characteristic such as indicated by a curve $a_1$ in FIG. 2 which is similar to that of a usual junction-type diode in a forward direction. Under such conditions, when the electrons and holes are deflected toward the high recombination velocity region F by applying a magnetic field +H to the magnetoresistance element SCM in a direction substantially at right angles to the current path as indicated by an arrow, the carriers are rapidly recombined with one another in the region F to shorten the mean life of the carriers, with the result that the magnetoresistance element SCM exhibits such a voltage-current characteristic as indicated by a curve $a_2$ in FIG. 2, namely, the resistance of the element SCM increases.

Upon application of a magnetic field −H opposite in direction to the magnetic field +H, the carriers are deflected away from the high recombination velocity region F to prolong the mean life of the carriers, in which case the voltage-current characteristic of the magnetoresistance element SCM becomes as indicated by a curve $a_3$ in FIG. 2, namely the resistance of the element SCM decreases.

Figure 3:
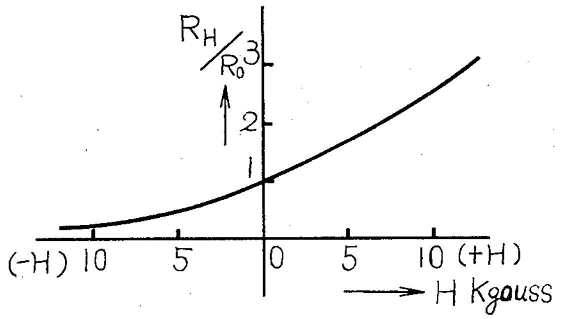
FIG. 3 is a graph showing the resistance versus magnetic field characteristic of the magnetoresistance element of FIG. 1.
Figure 4:
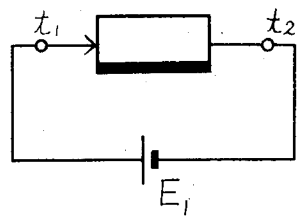
FIG. 4 is a connection diagram of the magnetoresistance element of FIG. 2.

In FIG. 3 there is illustrated the magnetic field versus resistance characteristic of the magnetoresistance element SCM, in which the abscissa represents the magnetic field applied to the magnetoresistance element SCM and the ordinate $R_H/R_O$, $R_O$ indicates the resistance value of the element SCM in the absence of the magnetic field and $R_H$ the resistance value of the element SCM when subjected to the magnetic field. It appears from the graph that the value of $R_H/R_O$ gradually decreases with an increase in the value (the absolute value) of the magnetic field −H, in other words the resistance value of the magnetoresistance element SCM decreases substantially in proportion to the value of the magnetic field −H, and that the value of $R_H/R_O$ gradually increases with an increase in the value (the absolute value) of the magnetic field +H, namely the resistance value of the element SCM increases substantially in proportion to the value of the magnetic field $+h$. That is, the magnetoresistance element SCM responds in different manners to the magnetic fields of opposite directions and its sensitivity is appreciably high, as compared with conventional elements. To symbolize the magnetoresistance element SCM, in FIG. 4 one of the longer sides of the rectangle is drawn heavy to indicate the high recombination velocity region F and both shorter edges represent the high impurity concentration regions.

Figure 5A:
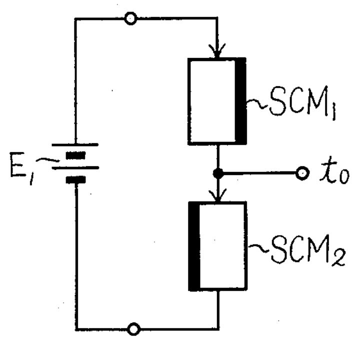
FIGS. 5A, 5B and 6 are circuit connection diagrams of the magnetoresistance elements.

The present invention employs magnetoresistance elements $SCM_1$ and $SCM_2$ such as described in the foregoing, which are connected in series with each other in the forward direction as shown in FIG. 5. The N-type region of either one of the magnetoresistance elements $SCM_1$ and $SCM_2$ is connected to the P-type region of the other magnetoresistance element, and a bias power source $E_1$ is connected to both ends of the series connection in such a manner that the positive and negative electrodes of the bias power source $E_1$ are respectively connected to the other P- and N-type regions of the magnetoresistance elements. An output terminal $t_0$ is connected to the connection point between the magnetoresistance ele-ments $SCM_1$ and $SCM_2$. In this case, the magnetoresistance elements $SCM_1$ and $SCM_2$ are disposed with their high recombination velocity regions being opposite in direction relative to a magnetic field applied thereto, so that when the resistance of either one of the elements is rendered small by the magnetic field that of the other element may be great. With such an arrangement, when the magnetoresistance elements $SCM_1$ and $SCM_2$ are subjected to a magnetic field of $\pm 2$ kilogausses while being connected to the bias power source $E_1$ of 6 volts, an output voltage of approximately $3 \pm 2$ volts is derived from the output terminal $t_0$.

Figure 5B:
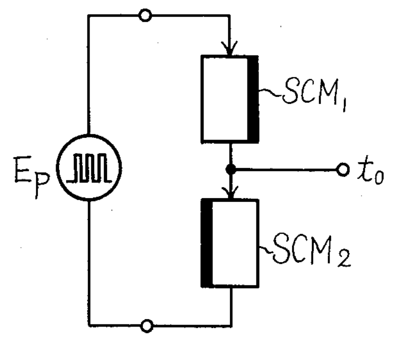

Although a DC power source is used as the bias power source $E_1$ in the foregoing, an AC power source (pulse power source) may be used as indicated by $Ep$ in FIG. 5B, in which case the sensitivity of the magnetoresistance elements can be enhanced for the reasons described later. In the figure, two magnetoresistance elements $SCM_1$ and $SCM_2$ are connected in series to each other, and the AC bias power source $Ep$ is connected to both ends of the series connection, and a terminal $t_0$ is connected to the connection point between the magnetoresistance elements $SCM_1$ and $SCM_2$.

Figure 9:
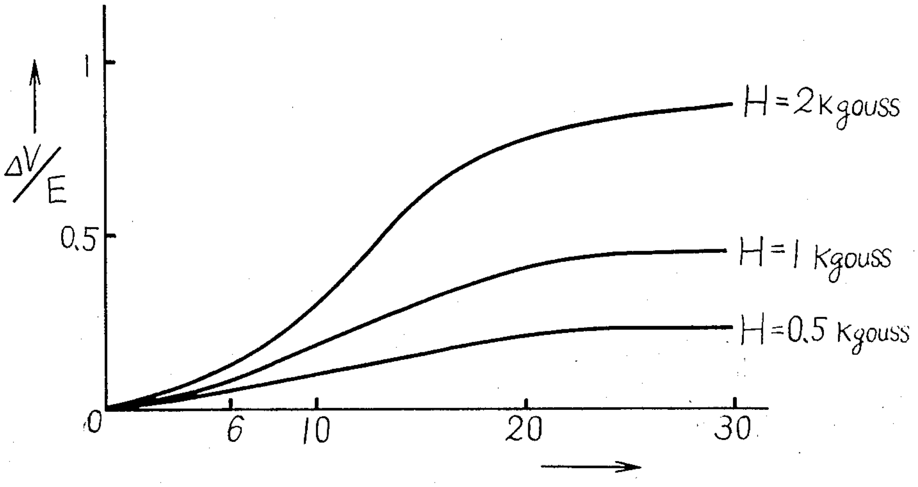
FIG. 9 is a graph showing the bias voltage versus sensitivity characteristic of the magnetoresistance elements.

FIG. 9 is a graph showing the power source voltage versus sensitivity characteristic of the magnetoresistance elements, in which the abscissa represents the power source voltage E and the ordinate represents the ratio of the output voltage variation ΔV relative to the power source voltage E, the magnetic field H being used as a parameter. It will appear from the graph that the voltage variation ΔV and the sensitivity increase with an increase in the power source voltage E. With an increase in the power source voltage, the temperature of the magnetoresistance elements rises due to Joule heat to cause an unfavorable influence, but the use of the pulse power source $E_p$ enables the use of a voltage which is extremely higher than that with the DC power source and hence the sensitivity can be enchanced correspondingly. Thus, the magnetoresistance element is extremely high in sensitivity to the magnetic field and such enhanced sensitivity cannot be obtained with the conventional magnetoresistance elements.

It is possible to control semiconductor elements such as transistors or the like by directly applying an output signal to them from the output terminal $t_0$. Further, the magnetoresistance element responds in a frequency range of zero to 100 kHz and hence has a wide frequency characteristic. In addition, the volume of the magnetoresistance element can be made, for example, approximately $0.1 \times 0.2 \times 1.0$ mm$^3$ or less and consequently the element is small in size, and since the element is formed of a non-magnetic material, it does not disturb the magnetic field applied thereto and is not likely to be magnetized and accordingly no mag-netic hysteresis is produced.

In the case where the two magnetoresistance elements are connected as shown in FIG. 5, their characteristics are opposite in direction under the same magnetic field, so that the over-all resistance of the series connection does not respond to the variation in the magnetic field and remains substantially constant, and since the influence of temperature is alleviated in accordance with the resistance dividing ratio of the two elements, they are stable irrespective of temperature.

Figure 6:
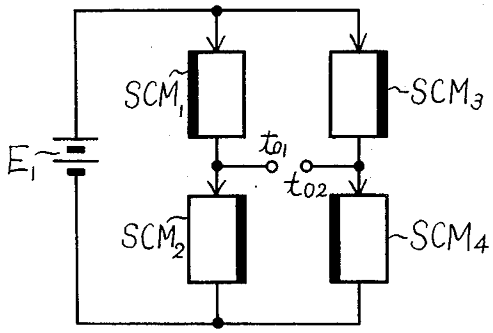

Further, it is possible to connect four magnetoresistance elements $SCM_1$ to $SCM_4$ in the form of a bridge circuit as illustrated in FIG. 6, by which there can be obtained between output terminals $t_{01}$ and $t_{02}$ a voltage which is switchingly reversed in polarity in response to the direction of a magnetic field applied. It is to be noted that Pat. No. 3,519,899 discloses in great detail the magnetoresistance elements SCM and various circuits for utilizing them.

Consequently, the influence of the earth's magnetic field can be obviated by the use of the above-described magnetoresistance elements in a color television receiver employing a cathode ray tube in which the electron beam is deflected under the influence of the earth's magnetic field. Namely, the magnetoresistance element assemblies are respectively positioned in the television receiver at suitable locations and in suitable directions and their outputs are moderately amplified and are then impressed on coils provided in the cathode ray tube at predetermined positions. In this way currents corresponding to the positioning of the receiver at suitable locations and in suitable directions and their outputs are moderately amplified and are then impressed on coils provided in the cathode ray tube at predetermined positions. In this way currents corresponding to the positioning of the receiver flow through the coils thereby automatically compensating for the influence of the earth's magnetic field.

It is to be realized that the earth's magnetic field is generally less than 1 gauss. For example, the horizontal intensity varies from about 0.27 gauss in the southern parts of the United States to about 0.16 gauss in the northern parts. The vertical component at Lancaster, Penn. is about 0.53 gauss, for example. Thus, although the magnetoresistance elements disclosed in Pat. No. 3,519,899 are very sensitive, it may be desirable to utilize flux collectors $M_1$ and $M_2$ as shown in FIG. 11 on both sides of magnetoresistance elements S of the bridge connection to provide for enhanced sensitivity. The elements S form a bridge such as shown in FIG. 6 and produce a differential output indicative of the strength and orientation of the field in the direction of the line 57 in FIG. 11. The flux collectors $M_1$ and $M_2$ may be formed of magnetic material and increase the sensitivity of the magnetoresistance elements S such that fields as low as $10^{-5}$ gauss may be detected.

The flux collectors $M_1$ and $M_2$ may be made of a composition of 5 percent molybdenum, 77 percent nickel and the rest iron. As shown in FIG. 11, the flux collectors $M_1$ and $M_2$ have a permeability of many times that of air and as is well known, a material of high permeability will "collect" and concentrate the magnetic flux in the space in which it is mounted due to its low magnetic reluctance and high permeability. This is elementary magnetic theory in that if magnetic flux can pass through side by side paths of high and low permeability, it will be concentrated in the path of high permeability and decreased in the path of low permeability. Thus, the flux collectors $M_1$ and $M_2$ collect the flux of the earth's magnetic field and concentrate it and pass it from flux collector $M_1$ to flux collector $M_2$ through the magnetoresistance elements S. As seen in FIG. 11, the elements of the magnetoresistance bridge shown in FIG. 6 are, of course, aligned such that the magnetic lines of force produce the maximum output signal so as to obtain maximum sensitivity. The bridge in FIG. 6 is aligned to detect magnetic fields passing into and out of the plane of the paper and the flux collectors would be aligned on either side of the plane of the paper relative to FIG. 6 for maximum concentration of flux and sensitivity. With flux collectors $M_1$ and $M_2$, fields as weak as $10^{-5}$ gauss may be detected. References showing how flux collectors of high permeability affect magnetic fields and concentrate the magnetic flux can be found on pages 442–449 of *Physics*, Hausman-Slack, Van Nostrand Company, 1939 Edition, and in FIG. 3 of U.S. Pat. No. 2,767,253 to Camras. In FIG. 11, the terminals 51 and 52 correspond to the terminals to which the battery $E_1$ is connected in FIG. 6. In FIG. 11, the terminals 53 and 54 correspond to terminals $t_{01}$ and $t_{02}$ in FIG. 6 and terminals $t_2$ and $t_1$ in FIGS. 7A and 7B. It is to be realized that the orientation of the recombination regions in the device S of FIG. 11 correspond to those of elements $SCM_1$, $SCM_2$, 3 and $SCM_4$ of those elements in FIG. 6. In this specification it is to be realized that when the term magnetoresistance element is used it may refer to an element such as shown in FIG. 6 or to one such as shown in FIG. 11 with the flux collectors $M_1$ and $M_2$.

It is also to be realized that the earth's magnetic field may be represented by a single vector but that it is usually defined by two vectors by giving the horizontal and vertical components of the field. These components vary at different locations on the earth. The present invention provides for the mounting of a plurality of magnetoresistance elements in a television set such that in any position of the television set corrective voltages will be produced for compensating for the earth's magnetic field.

For this purpose, in the present invention magnetoresistance elements are respectively connected through DC amplifiers to a main coil provided around the front panel of the cathode ray tube and a pair of coils located at the upper and lower left-hand corners of the front panel and another pair of coils positioned at the upper and lower right-hand corners of the front panel. Each of the magnetoresistance elements is supplied with a predetermined bias through the use of a suitable bias power source, and the magnetoresistance elements connected to the pairs of left- and right-hand corner coils are positioned at a predetermined angle to the elements connected to the main coil.

Figure 7A:
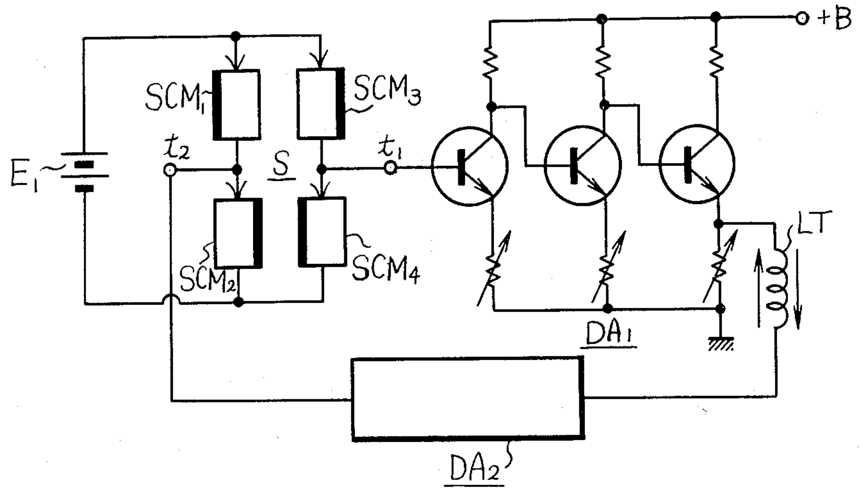
FIGS. 7A and 7B are circuit diagrams illustrating, by way of example, the connections of the magnetoresistance elements with a coil.

FIG. 7A illustrates, by way of example, the connections of magnetoresistance elements to the main coil, in which case four magnetoresistance elements $SCM_1$, $SCM_2$, $SCM_3$ and $SCM_4$ are connected in the form of a bridge circuit as shown in FIG. 6, and they are supplied with a DC bias from a bias power source $E_1$. One output terminal $t_1$ of the magnetoresistance element assembly S is connected to one end of a main coil $L_T$ through a first DC amplifier $DA_1$, and the other output terminal $t_2$ is connected to the other end of the main coil $L_T$ through a second DC amplifier $DA_2$. The first DC amplifier $DA_1$ consists of three-stage emitter grounded type transistor amplifier circuits of cascade connection as shown in the figure. However, this amplifier need not always be of such a construction but it may be substituted with a mere DC amplifier which is capable of amplifying the output of the magnetoresistance element assembly up to a predetermined level. The second DC amplifier $DA_2$ is identical in construction with the first DC amplifier $DA_1$. Further, the connections of the magnetoresistance elements to the right- and left-hand corner coils are similar to those with the main coil, and hence further description is unnecessary.

Figure 8A:
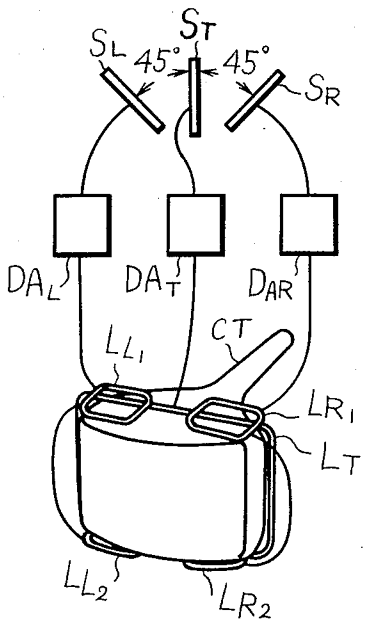
FIGS. 8A and 8B are schematic diagrams showing examples of this invention.

The magnetoresistance elements respectively connected to the coils through the DC amplifiers are disposed in a television receiver as shown in FIG. 8A. Namely, a magnetoresistance element assembly $S_L$ connected to left-hand corner coils $L_{L1}$ and $L_{L2}$ and a magnetoresistance element assembly $S_R$ connected to right-hand corner coils $L_{R1}$ and $L_{R2}$ are respectively located at an angular distance of 45 degrees to a magnetoresistance element assembly $S_T$ connected to the main coil mounted around the front panel of a color Braun tube CT. In the figure reference characters $DA_T$, $DA_L$ and $DA_R$ respectively designate DC amplifiers. Thus, the coils $L_T$, $L_{L1}$ and $L_{L2}$, $L_{R1}$ and $L_{R2}$ are supplied with currents such as depicted in FIG. 10 which varies with the earth's magnetic field in accordance with the positioning of the television receiver.

FIGS. 10A, 10B and 10C respectively illustrate the variations in the currents flowing through the left-hand corner coils $L_{L1}$ and $L_{L2}$, the main coil $L_T$ and the right corner coils $L_{R1}$ and $L_{R2}$, the abscissas representing the currents, and the ordinates the positioning of the color television receiver.

FIGS. 10A, 10B and 10C show currents necessary for removing the influence of the earth's magnetic field exerted upon the television receiver when the receiver is shifted. As illustrated, the current flowing through the main coil $L_T$ is phased 45 degrees apart from the current flowing through the left-hand corner coils $L_{L1}$ and $L_{L2}$, and the current flowing through the right-hand corner coils $L_{R1}$ and $L_{R2}$ is displaced 45° apart in phase from the current of the main coil $L_T$. Accordingly, the currents passing through the left-hand corner coils $L_{L1}$ and $L_{L2}$ and the right-hand corner coils $L_{R1}$ and $L_{R2}$ are phased 90° apart.

Therefore, the magnetoresistance element assemblies $S_L$ and $S_R$ connected to the left- and right-hand corner coils are respectively disposed obliquely at an angle of 45° to the magnetoresistance element assembly $S_T$ connected to the main coil as depicted in FIG. 10, by which the coils are supplied with such currents as shown in FIGS. 10A, 10B and 10C in response to the shifting of the television receiver.

Figure 7B:
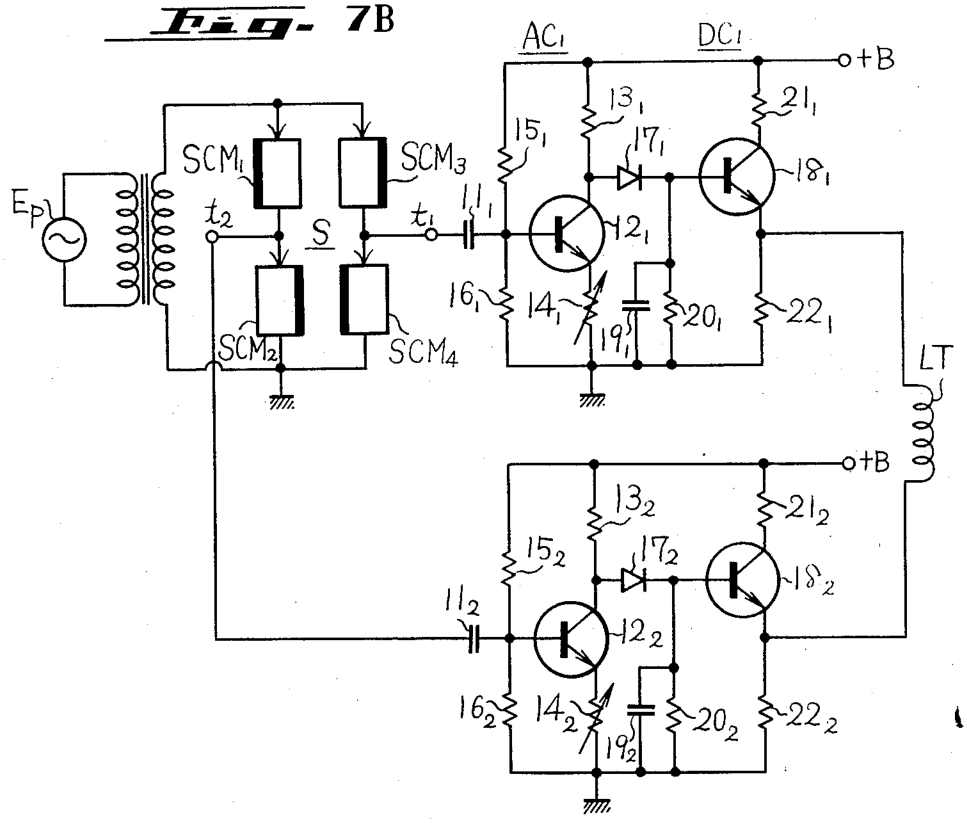

While the magnetoresistance elements are actuated by a DC bias in the foregoing, the elements may be operated by an AC bias. Namely, four magnetoresistance elements $SCM_1$ — $SCM_4$ are connected in the form of a bridge circuit as shown in FIG. 7B and the magnetoresistance element assembly S is supplied with a predetermined AC bias from an AC bias power source $E_p$ through a transformer 10. One output terminal $t_1$ of the magnetoresistance element assembly S is connected to the base of an amplifying transistor 12, through a capacitor $11_1$. The collector of the transistor $12_1$ is connected to a power source +B through a resistor $13_1$ and its emitter is grounded through a variable resistor $14_1$. Further, the connection point of biasing resistors $15_1$ and $16_1$ connected in series between the power source +B and ground is connected to the base of the transistor $12_1$, thus constututing an AC amplifier $AC_1$. The output of the AC amplifier $AC_1$ is rectified by a rectifying element $17_1$ such as, for example, a diode and is then applied to the base of an amplifying transistor $18_1$. Between the base of the transistor $18_1$ and ground, a parallel circuit of a capacitor $19_1$ and a resistor $20_1$ is connected, and the collector of the transistor $18_1$ is connected to the power source +B through a resistor $21_1$ and the emitter is grounded through a resistor $22_1$, thus providing a DC amplifier $DC_1$. The amplifier $DC_1$ is constructed in the emitter-follower type, so that its output is picked up from the emitter of the transistor $18_1$ to be fed to one end of the main coil $L_T$.

The other output terminal $t_2$ of the magnetoresistence element assembly S is connected to the other end of the main coil $L_T$ through identical circuit connections with those for the output terminal $t_1$. Accordingly, similar elements are identified by the similar reference numerals and characters but with different suffixes and no further description will be repeated. The connections of the magnetoresistance elements with the right- and left-hand corner coils are also identical with the aforementioned connections with the main coil $L_T$ and accordingly no description will be given thereof.

Thus, the use of the AC power source for the magnetoresistance elements enhances the sensitivity of the elements and enables amplification of the outputs of the magnetoresistance elements by the AC amplifier as described above, which provides for stabilized operation and remarkedly enhanced efficiency. In addition, sinusoidal waves, horizontal and vertical pulses and the like in the television receiver can be directly made use of as the AC power source.

Figure 8B:
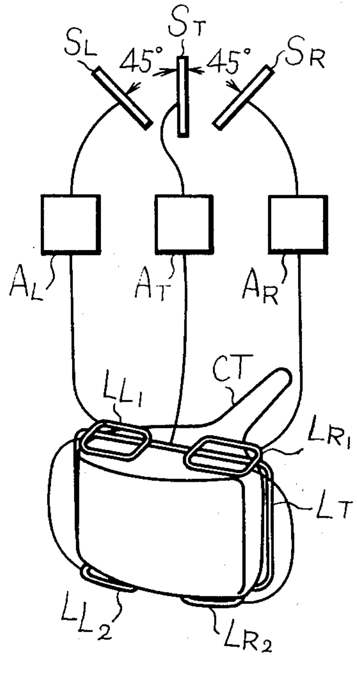

The magnetoresistance elements respectively connected to the coils through the AC amplifiers, rectifying elements and DC amplifiers are arranged in the television receiver in such a manner as illustrated in FIG. 8B. Namely, the magnetoresistance element assemblies $S_L$ and $S_R$ respectively connected to the left-hand corner coils $L_{L1}$ and $L_{L2}$ and the right-hand corner coils $L_{R1}$ and $L_{R2}$ are respectively positioned at an angular distance from the magnetoresistance element assembly $S_T$ connected to the main coil $L_T$ mounted around the front panel of the chromatron color Braun tube CT. In the figure reference characters $A_T$, $A_L$ and $A_R$ respectively indicate amplifying systems, each consisting of an AC amplifier, a rectifying element and a DC amplifier. Thus, the coils $L_T$, and $L_{L1}$ and $L_{L2}$, $L_{R1}$ and $L_{R2}$ are supplied with such currents as shown in FIG. 10 in response to the variation of the earth's magnetic field caused by shifting the television receiver.

With such an arrangement as has been described in the foregoing, the output currents of the magnetoresistance elements automatically vary with a change of the earth's magnetic field exerted on the television receiver when the receiver is shifted. As a result of this, the coils are always supplied with currents for eliminating the influence of the earth's magnetic field, thereby to avoid deterioration of color purity which is caused according to particular positioning of the television receiver. Further, once the positions of the magnetoresistance elements and the amplification of the DC amplifiers are established in a manner to obtain such currents as shown in FIGS. 10A–10C, the currents fed to the coils need not be subsequently readjusted in accordance with the positioning of the television receiver.

To understand how the three elements $L_L$, $S_R$ and $S_T$ can detect and correct for the earth's magnetic field for any position of a television set, let it be assumed that the television tube is orientated so that the plane of the face of the tube lies on an east-west line. If the horizontal component of the earth's magnetic field is directly aligned with north at that location, with the orientation of the elements $S_T$, $S_L$ and $S_R$ shown in FIG. 8A, the element $S_T$ will not detect a vertical component and the elements $S_L$ and $S_R$ will produce outputs resulting from the vertical component. As the television set is rotated about a vertical axis the elements $S_T$, $S_L$ and $S_R$ will produce outputs varying as the angular position of the set and voltages will be produced which can correct for the effect of the earth's field.

In a similar manner the elements $S_L$, $S_T$ and $S_R$ detect the horizontal component of the earth's magnetic field and produce signals which compensate the tube for it. Thus, it is seen that the use of three detector elements such as $S_T$, $S_L$ and $S_R$ are capable of detecting the earth's magnetic field for any position of a television set at any location on earth. Although the earth's field is oftentimes considered as two vectors resolved into horizontal and vertical components, it is to be realized that actually the field at any point may be represented as a single three-dimensional vector. Only three detectors are required to detect and correct for the earth's field as described herein and an infinite number of detectors is not required. The placement of those detectors as shown in FIGS. 8A and 8B in combination with the corrector coils $L_{L1}$, $L_{L2}$, $L_{R1}$, $L_{R2}$ and $L_T$ are capable of correcting for the earth's magnetic field for any orientation of a television set.

It is also possible to dispose magnetic flux collectors $M_1$ and $M_2$ on both sides of the magnetoresistance elements S of the bridge connection as shown in FIG. 11 to provide for enhanced sensitivity of the elements.

Although the magnetoresistance elements of the bridge connection are employed in the foregoing, the present invention is not limited specifically thereto. The amplifiers are disposed on both sides of each of the coils but either one of the amplifiers may be left out. Further, the magnetoresistance element assemblies $S_L$ and $S_R$ respectively connected to the left- and right-hand corner coils are respectively placed at an angular distance of 45° from the magnetoresistance element assembly $S_T$ connected to the main coil $L_T$, but this implies that the magnetoresistance element assemblies are arranged in such a manner to supply the coils with currents such as shown in FIGS. 10A–10C.

What we claim is:

1. An apparatus for automatically compensating for changes in the effect of the earth's magnetic field on a color television receiver having a cathode ray tube with a front panel mounted in a plane parallel to the face of the cathode ray tube comprising:

first, second and third detection means for sensing the earth's magnetic field and producing voltages in response thereto, each of said means including at least one magnetoresistance element;

said first, second and third detection means being arranged such that the second and third detection means are mounted at 45° to said first means and at 90° relative to each other;

said first detection means lying in a vertical plane which is normal to the face of said cathode ray tube, said second and third detection means lying in planes normal to the face of said cathode ray tube, voltage sources respectively connected to said first, second and third detection means;

first, second and third means for respectively amplyfying the outputs of the first, second and third detection means;

a main coil mounted about the face of the cathode ray tube adjacent to the front panel of the cathode ray tube and lying in a vertical plane parallel to said face and extending around said cathode ray tube;

a first pair of coils respectively mounted at the upper and lower left-hand portions of said cathode ray tube and lying in horizontal planes;

a second pair of coils at the upper and lower right-hand portions of the cathode ray tube and lying in horizontal planes, means for applying the output of the first amplifying means to said main coil:

means for applying the output of the second amplifying means to the first pair of coils:

means for applying the output of the third amplifying means to said second pair of coils; and first, second and third magnetic flux collector means respectively disposed adjacent to and aligned with each of the first, second and third detection means so as to enhance the sensitivity of said means.

2. An apparatus for automatically eliminating the influence of the earth's magnetic field on color television receivers in accordance with claim 1 wherein said first, second and third detection means each include magnetoresistance elements each having a region of N-type semi-conductor material, a region of P-type semiconductor material, and an intermediate region of semi-conductor material having less carrier concentration than either said P-type region or said N-type region between said P- and N-type regions, and said intermediate region having a discrete region of recombination centers different from the remainder of the intermediate region which are asymmetrically located with respect to the center axis of carrier flow.

3. An apparatus for automatically eliminating the influence of the earth's magnetic field on a color television receiver in accordance with claim 1 wherein each of the first, second and third detection means consists of four magnetoresistance elements connected in the form of a bridge circuit.

4. An apparatus for automatically eliminating the influence of the earth's magnetic field on a color television receiver in accordance with claim 1 wherein the first, second and third means detection each include a pair of magnetoresistance elements connected in series with one another each comprising a region of semi-conductor material having a P-type region, an N-type region and a substantially intrinsic semi-conductor region located at least in part between said P-type and N-type regions, said intrinsic semi-conductor region having a discrete region of recombination centers different from the remainder of the intermediate region which are asymmetrically located with respect to the center axis of the carrier flow and said pair of magnetoresistance elements positioned relative to each other such that when placed in a magnetic field directed perpendicular to the direction of current flow the current carriers in one of the elements will be deflected toward said discrete region of recombination centers to increase the resistance and the current carriers in the other element will be deflected from said descrete region of recombination centers to decrease the resistance.

* * * * *

UNITED STATES PATENT OFFICE
CERTIFICATE OF CORRECTION

Patent No. 3,757,154 Dated September 4, 1973

Inventor(s) Tokita et al

It is certified that error appears in the above-identified patent and that said Letters Patent are hereby corrected as shown below:

Page 1, after "[75] Inventors: ", replace "Okita" with --Tokita--.

Column 9, line 18, replace "$L_L$" with --$S_L$--.

Signed and sealed this 14th day of May 1974.

(SEAL)
Attest:

EDWARD M. FLETCHER, JR.
Attesting Officer

C. MARSHALL DANN
Commissioner of Patents